United States Patent
Yoshimoto et al.

(10) Patent No.: US 7,583,571 B2
(45) Date of Patent: Sep. 1, 2009

(54) WRITE BASED POWER ADAPTIVE CONTROL SYSTEM

(75) Inventors: Ainobu Yoshimoto, Milpitas, CA (US); Hung Phi Dang, Santa Clara, CA (US)

(73) Assignee: LSI Corporation, Milpitas, CA (US)

( * ) Notice: Subject to any disclaimer, the term of this patent is extended or adjusted under 35 U.S.C. 154(b) by 605 days.

(21) Appl. No.: 11/273,518

(22) Filed: Nov. 14, 2005

(65) Prior Publication Data

US 2007/0109937 A1     May 17, 2007

(51) Int. Cl.
    *G11B 7/00* (2006.01)
(52) U.S. Cl. .................. 369/47.5; 369/59.1; 369/116
(58) Field of Classification Search ............... 369/59.1
    See application file for complete search history.

(56) References Cited

U.S. PATENT DOCUMENTS

| | | | |
|---|---|---|---|
| 5,663,941 A | 9/1997 | Aoshima | 369/44.34 |
| 5,793,736 A * | 8/1998 | Ishimaru et al. | 369/53.26 |
| 6,728,178 B2 * | 4/2004 | Koishi et al. | 369/47.53 |
| 6,771,576 B2 * | 8/2004 | Okumura et al. | 369/47.25 |
| 6,950,378 B1 | 9/2005 | Miyazaki et al. | 369/47.52 |
| 7,053,919 B2 * | 5/2006 | Nagano | 347/236 |
| 7,085,210 B2 * | 8/2006 | Ogawa | 369/47.53 |
| 7,133,337 B2 * | 11/2006 | Miyaki | 369/47.5 |
| 2005/0219981 A1 * | 10/2005 | Iimura | 369/53.26 |

\* cited by examiner

*Primary Examiner*—Muhammad N. Edun
(74) *Attorney, Agent, or Firm*—Christopher P. Maiorana, PC

(57) ABSTRACT

An apparatus comprising a first circuit, a second circuit and a third circuit. The first circuit may be configured to (i) generate a read power signal and (ii) control power of a laser beam emitted from an optical pick-up circuit during a read process. The second circuit may be configured to (i) generate a first write power signal and (ii) control one or more power levels of the laser beam during a write process in response to a second write power signal. The third circuit may be configured to generate the second write power signal and a third write power signal in response to a target write signal.

21 Claims, 5 Drawing Sheets

WRITE BASED POWER ADAPTIVE CONTROL SYSTEM

FIELD OF THE INVENTION

The present invention relates to an optical storage system generally and, more particularly, to a method and/or apparatus for implementing a write based power adaptive control system.

BACKGROUND OF THE INVENTION

In conventional optical storage systems, in order to create a laser beam operating at a consistent power level when the temperature changes, an optical pick-up unit needs different levels of power during a read process and a write process. Conventional designs can only modify some of the control signals to compensate for temperature changes. However, other signals cannot be adapted to maintain the laser beam at the same power during temperature changes due to a lack of a control mechanism. The failure to control each of the control signals leads to the degradation of write quality when the temperature changes during the write process or between two consecutive write processes. Write power is not controlled well during temperature changes and leads to the degradation of write quality, particularly in high speed recording.

It would be desirable to implement a system for controlling an optical storage system that allows the control signals to be adjusted to allow a consistent power level across a range of temperature variations.

SUMMARY OF THE INVENTION

The present invention concerns an apparatus comprising a first circuit, a second circuit and a third circuit. The first circuit may be configured to (i) generate a read power signal and (ii) control power of a laser beam emitted from an optical pick-up circuit during a read process. The second circuit may be configured to (i) generate a first write power signal and (ii) control one or more power levels of the laser beam during a write process in response to a second write power signal. The third circuit may be configured to generate the second write power signal and a third write power signal in response to a target write signal.

The objects, features and advantages of the present invention include providing a method and/or apparatus for a write based power adaptive control that may (i) improve the write quality on an optical disc, (ii) be useful when undergoing high recording speeds, (iii) provide accurate control of the write power as the temperature changes and/or (iv) be simple to implement.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
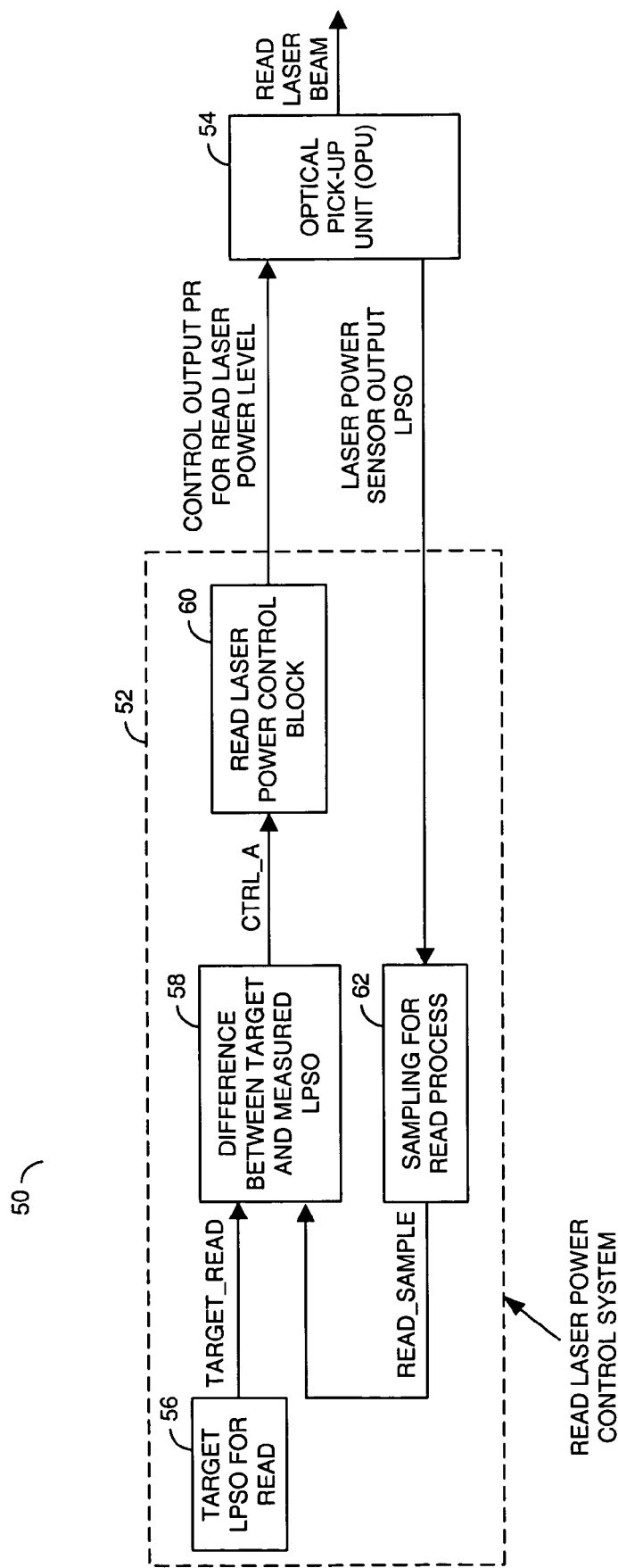
FIG. 1 is a diagram illustrating a block diagram for a read laser power control.

Referring to FIG. 1, a diagram of a system 50 illustrating a read laser power control is shown. The system 50 comprises a read laser power control system 52 and an optical pick-up unit (OPU) 54. The read laser power control system 52 presents a signal PR to the optical pick-up unit 54. The optical pick-up unit 54 generates laser beam during the read process on a signal READ_LASER_BEAM. The OPU 54 includes a laser power sensor (not shown) which presents a signal LASER_POWER_SENSOR_OUTPUT (or signal LPSO) to the read laser power control system 52. The read process needs a constant level of power (or read power level) for the OPU 54 to generate the laser beam during the read process.

The read laser power control system 52 comprises a target LPSO read block (or circuit) 56, a difference read block (or circuit) 58, a read laser control block (or circuit) 60 and a read sampling circuit 62. The read sampling circuit 62 presents a signal READ_SAMPLE to the difference read circuit 58. The target LPSO read block (or circuit) 56 presents a signal TARGET_READ to the difference read block (or circuit) 58. The difference read block (or circuit) 58 presents a signal CTRL_A to the read laser control circuit 60. The read sampling circuit 62 provides a sampling value of the signal LPSO. The blocks (or circuits) 56, 58 and 60 may be implemented as an analog circuit or as a digital DSP code and memory (referred to as a block).

Control of the read power level is based the signal TARGET_READ and on a sampling value of the signal LPSO on the signal READ_SAMPLE. The target LPSO read block (or circuit) 56 defines the target value for the system 50 to ensure that the read power level remains unchanged during the read process. The difference read block (or circuit) 58 compares the difference between the signal TARGET_READ and the signal READ_SAMPLE. The signal READ_SAMPLE may vary from the signal TARGET_READ. The difference read block (or circuit) 58 generates the signal CTRL_A which corrects the variance between the signal TARGET_READ and the signal READ_SAMPLE. The read laser power control circuit 60 generates the signal PR in response to the signal CTRL_A. The signal PR will keep the read laser power level unchanged during the read process.

Figure 2:
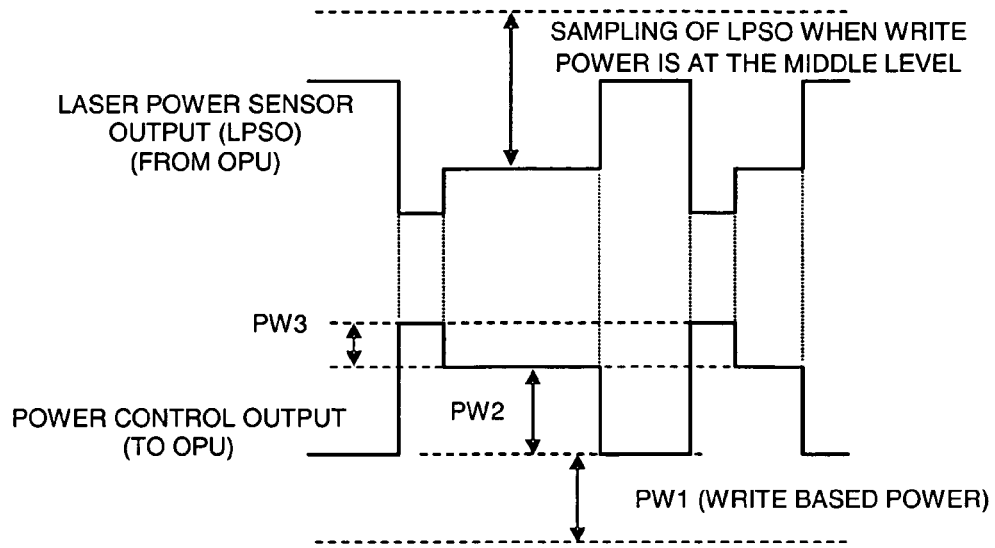
FIG. 2 is a diagram illustrating a block type write process.
Figure 3:
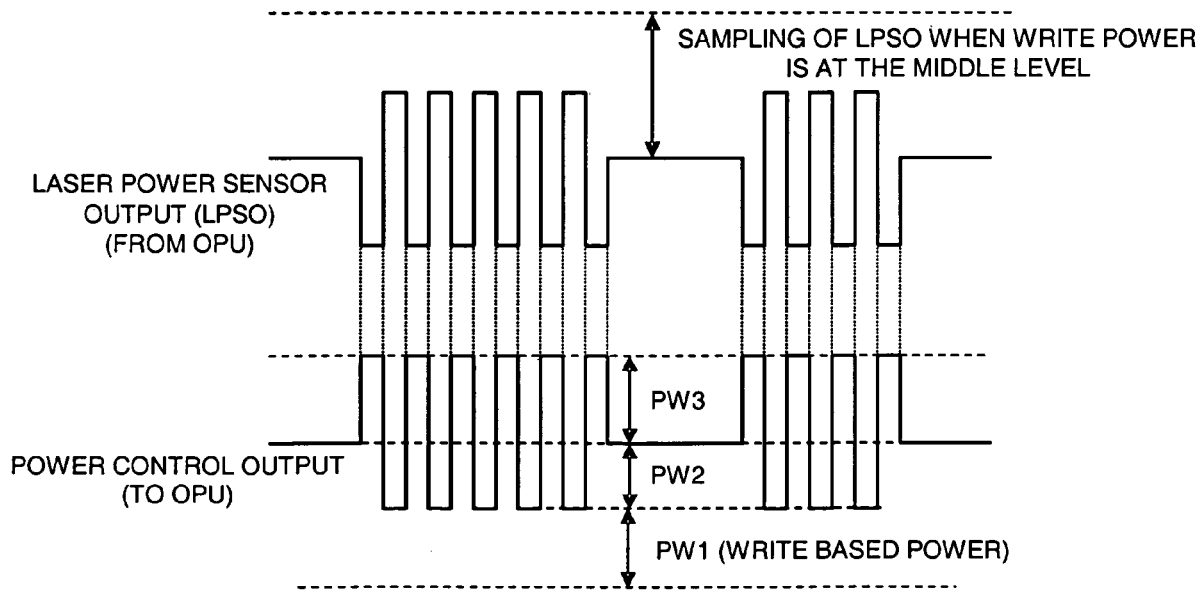
FIG. 3 is a diagram illustrating a pulse type write process.

Referring to FIGS. 2-3, diagrams illustrating various write processes are shown. Generally, a write process needs three different power levels for a laser beam at different timing. These different power levels comprise (i) a lowest write power level (or write based power level), (ii) a middle write power level and (iii) a top write power level. Depending on the method needed to change the write power level during the write process, there are 2 types of write processes. The first write process is a block-type write process and the second write process is a pulse-type write process. FIG. 2 illustrates the block type write process. In the block-type write process, while creating a pit of data on a disc, the write power level does not vary significantly. FIG. 3 illustrates the pulse-type write process. In the pulse-type write process, while creating a pit of data on a disc, the write power level changes frequently.

Figure 4:
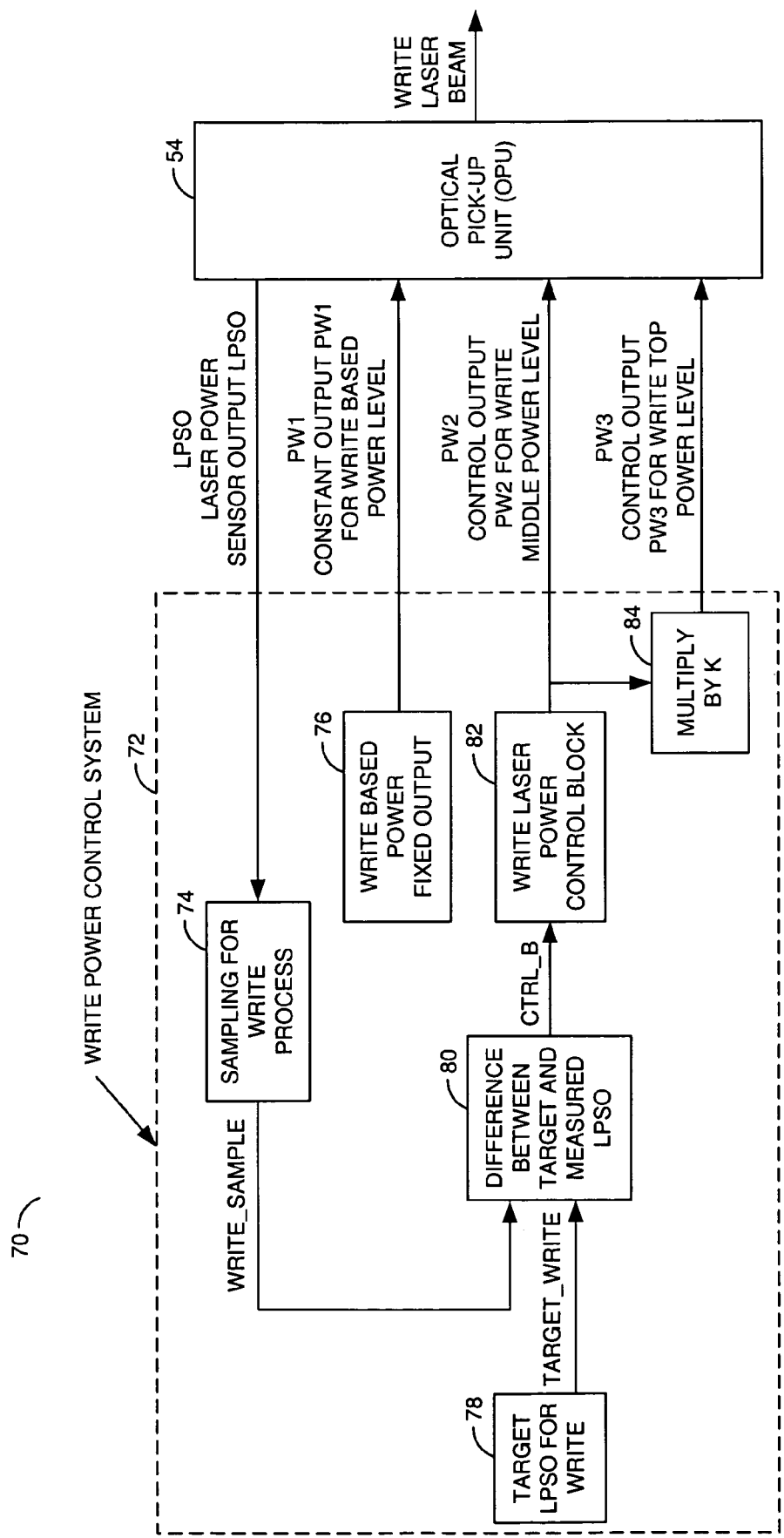
FIG. 4 is a diagram illustrating a block diagram for a write laser power control.

Referring to FIG. 4, a diagram illustrating a block diagram for a write laser power control is shown. The system 70 comprises a write laser power control system 72 and the OPU 54. The write laser power control circuit 72 presents (i) a power control signal PW1 (or first write power signal), (ii) a power control signal PW2 (or second write power signal), and (iii) a power control signal PW3 (or third write power signal). The OPU 54 presents the signal LPSO to the write laser power control circuit 72. The OPU 54 generates the laser beam used for the write process on a signal WRITE_LASER_BEAM. To generate the write laser beam with the different power levels (e.g., the write based power level, the middle write power level and the top write power level) at different timing, the OPU 54 needs the power control signals (e.g., signal PW1, PW2 and PW3).

The write laser power control system 72 generally comprises a write sampling circuit 74, a write based fixed circuit 76, a target LPSO write block (or circuit) 78, a difference write block (or circuit) 80, a write laser control circuit 82 and a multiplier circuit 84. The write sampling circuit 74 presents a signal WRITE_SAMPLE to the difference read block (or circuit) 80. The target LPSO write block (or circuit) 78 presents a signal TARGET_WRITE to the difference write block (or circuit) 80. The difference write block (or circuit) 80 presents a signal CTRL_B to the write laser control circuit 82. The blocks (or circuits) 78 and 80 may be implemented as an analog circuit or as a digital DSP code and memory (referred to as a block).

The write power control system 72 controls the different power levels of the write laser beam based on the signal TARGET_WRITE and on the feedback of the sampling value of the signal LPSO on the signal WRITE_SAMPLE. The control signals PW1, PW2, and PW3 generated by the control system 72 will keep the laser beam at the three designed levels during the write process.

In the OPU 52, in order to generate the three different power levels at a different timing during the write process based on the control signals PW1, PW2 and PW3, the power level of the write laser beam at any time is generated in proportion to the sum of the control signals PW1, PW2, and PW3. When it is necessary for the system 70 to generate the write laser beam at the write based power level, the write power control system 72 will turn off the signals PW2 and PW3. As a result, the sum between the signal PW1, PW2, PW3 is the signal PW1. The OPU 54 will generate the write laser beam with the power level (e.g., at the write based power level) in proportion to the signal PW1.

When it is necessary for the system 70 to generate the write laser beam at the middle write power level, the write power control system 72 will turn off the signal PW3 and turn on the signals PW1 and PW2. As a result, the sum between the control signals PW1, PW2, and PW3 are the signals PW1 and PW2. The OPU 54 will generate the write laser beam with the power level (e.g., at the middle write power level) in proportion to the sum between the signals PW1 and PW2.

When it is necessary for the system 70 to generate the write laser beam at the top write power level, the write power control system 72 will turn on each of the signals PW1, PW2, and PW3. As a result, the write power control system 72 will generate the write laser beam with a power level (e.g., at the top write power level) in proportion to the sum of the control signals PW1, PW2, and PW3. The signal WRITE_SAMPLE is the sampled value of the signal LPSO.

To simplify the sampling and control design of the system 70, the signal LPSO is sampled when the write power of the laser beam is at the middle power level. The middle and top write power levels are controlled by the signals PW2 and PW3. The signals PW2 and PW3 are calculated by the write laser power control circuit 72 based on the sampled value of the signal LPSO on the signal WRITE_SAMPLE and a target value of LPSO on the signal TARGET_WRITE. The difference write block (or circuit) 80 compares the difference between the signal TARGET_WRITE and the signal WRITE_SAMPLE. The difference write circuit 80 generates the signal CTRL_B which corrects any variance between the signal WRITE_SAMPLE and the signal TARGET_WRITE. The target LPSO write block (or circuit) 78 may set the signal TARGET_WRITE to a first target value (or normal target). The write laser power control circuit 82 generates the signal PW2 in response to the signal CTRL_B. The multipler circuit 84 may generate the signal PW3 by multiplying the signal PW2 with a compensation value (e.g., K).

While spinning up the optical disc, the write based power level is calibrated once during the start up process. The write based power level is not controlled during the entire write process. However, during the write process and due to temperature changes, different control signals PW1, PW2, and PW3 may be needed to maintain or keep the write power levels unchanged. For example, as the OPU 54 gets hotter, a higher control signal PW1 may be needed. With conventional power control designs, the signal PW1 for the write-based power level is fixed during the entire write process. As a result, a temperature change exhibited during the write process may lead to the degradation of write quality, particularly in high speed recording.

Figure 5:
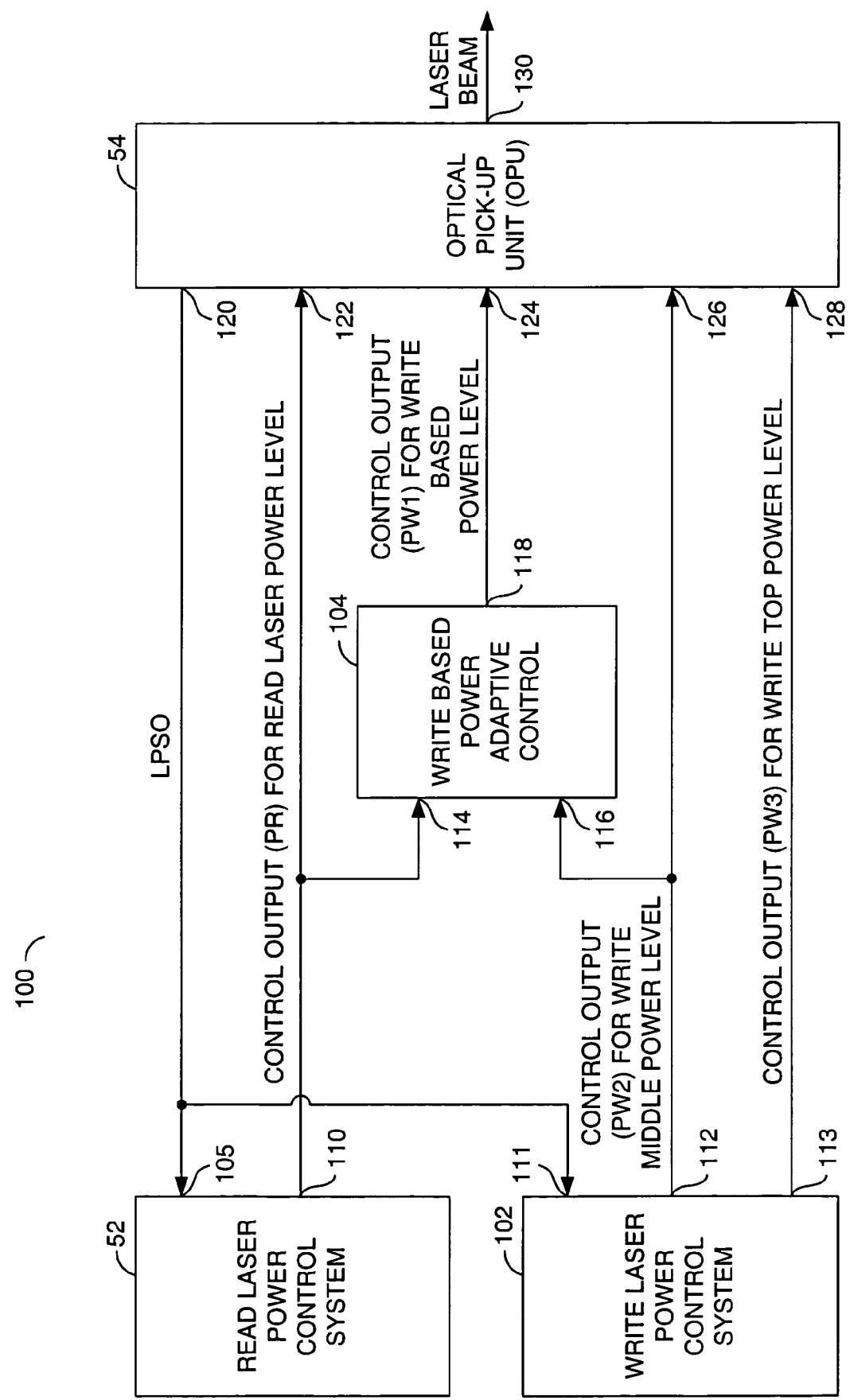
FIG. 5 is a diagram illustrating a write based power adaptive control system.

Referring to FIG. 5, a diagram of a system 100 is shown. The system 100 generally comprises the read laser power control system 52, the OPU 54, a write laser power control system 102, and a write based power adaptive control circuit 104. The read laser power control circuit 52 may have an input 105 that may receive the signal LPSO and an output 110 that may present the signal PR. The write laser power control circuit 102 may have an input 111 that may receive the signal LPSO. The write laser power control circuit 102 may have an output 112 that may present the signal PW2 and an output 113 that may present the signal PW3. The write based power adaptive control circuit 104 may have an input 114 that may receive the control signal PR (or read power signal), an input 116 that may receive the control signal PW2 and an output 118 that may present the control signal PW1. The OPU 54 may have an input 122 that may receive the signal PR, an input 124 that may receive the signal PW1, an input 126 that may receive the signal PW2, and an input 128 that may receive the signal PW3. The OPU 54 may have an output 120 that may present the signal LPSO and an output 130 that may present a signal LASER_BEAM.

During a disc start up, the signal PW1 may be calibrated to a start write based power signal (e.g. PW1S). During an initial read from an optical disc, the system 100 may perform a read initialized step to compute a start read power signal (e.g., PR0S). The signal PR0S may be defined as an average value of the signal PR in the initial read process.

At the beginning of the write process, the write based power adaptive control circuit 104 may adjust the signal PW1 by the following equation:

$$PW1 = PW1S + KR*(PR0WS - PR0S) \quad \text{(EQ1)}$$

Where (i) PR0WS may be defined as the average value of the signal PR (or average read power control output) prior to starting the write process and (ii) KR may be defined as a compensation factor which may be a design constant.

At the beginning of the write process, the write based power adaptive control circuit 104 may also compute a start control output signal (e.g., signal PW2S). The signal PW2S may be an average value of the signal PW2 at the beginning of the write process for the write middle power level.

The signal PW2S may be used as the control target for write based power control during the write process. The value of the signal PW2S may not be recalculated as long as the target for the LPSO (or the signal TARGET_WRITE) (not shown) as determined by the LPSO write circuit (not shown)

in the write laser power control system 102 has not changed. The signal TARGET_WRITE generally does not change during a normal write process. The signal TARGET_WRITE is generally set to the first target value. However, the signal TARGET_WRITE may change when the surface of a disc has a fingerprint area. Writing in the fingerprint area may need higher power than normal. The target LPSO write circuit may change the signal TARGET_WRITE to a second target value to increase write power when writing on the fingerprint area of the disc. After writing in the fingerprint area, the target LPSO write circuit may change the signal TARGET_WRITE from the second target value to the first target value when writing to a normal area of the disc (e.g., no presence of fingerprints).

During the write process, the write based power adaptive control circuit 104 may adjust the value of the signal PW1 as follows:

(i) If a target of the middle write power level is unchanged (or the signal TARGET_WRITE as the OPU 54 generates the laser beam at the middle write power level is unchanged) and the average value of the output control signal PW2 is greater than the signal PW2S, then the write based power adaptive control circuit 104 may increase the signal PW1 by a fixed predetermined amount (e.g., PW1D). The updated signal PW1 may be defined by the following equation:

$$PW1=PW1+PW1D \text{ if the average of } PW2>PW2S; \quad (EQ2)$$

(ii) If the target of the middle write power level is unchanged and the average value of the signal PW2 is less than the signal PW2S, then the write based power adaptive control circuit 104 may decrease the signal PW1 by the fixed predetermined amount (e.g., PW1D). The updated signal PW1 may be defined by the following equation:

$$PW1=PW1-PW1D \text{ if average of } PW2<PW2S; \quad (EQ3)$$

(iii) If the target of the middle write power level has changed, then the write based power adaptive control 104 may recalculate the signal PW2S as an average value of the output control signal PW2 at that particular moment.

Figure 6:
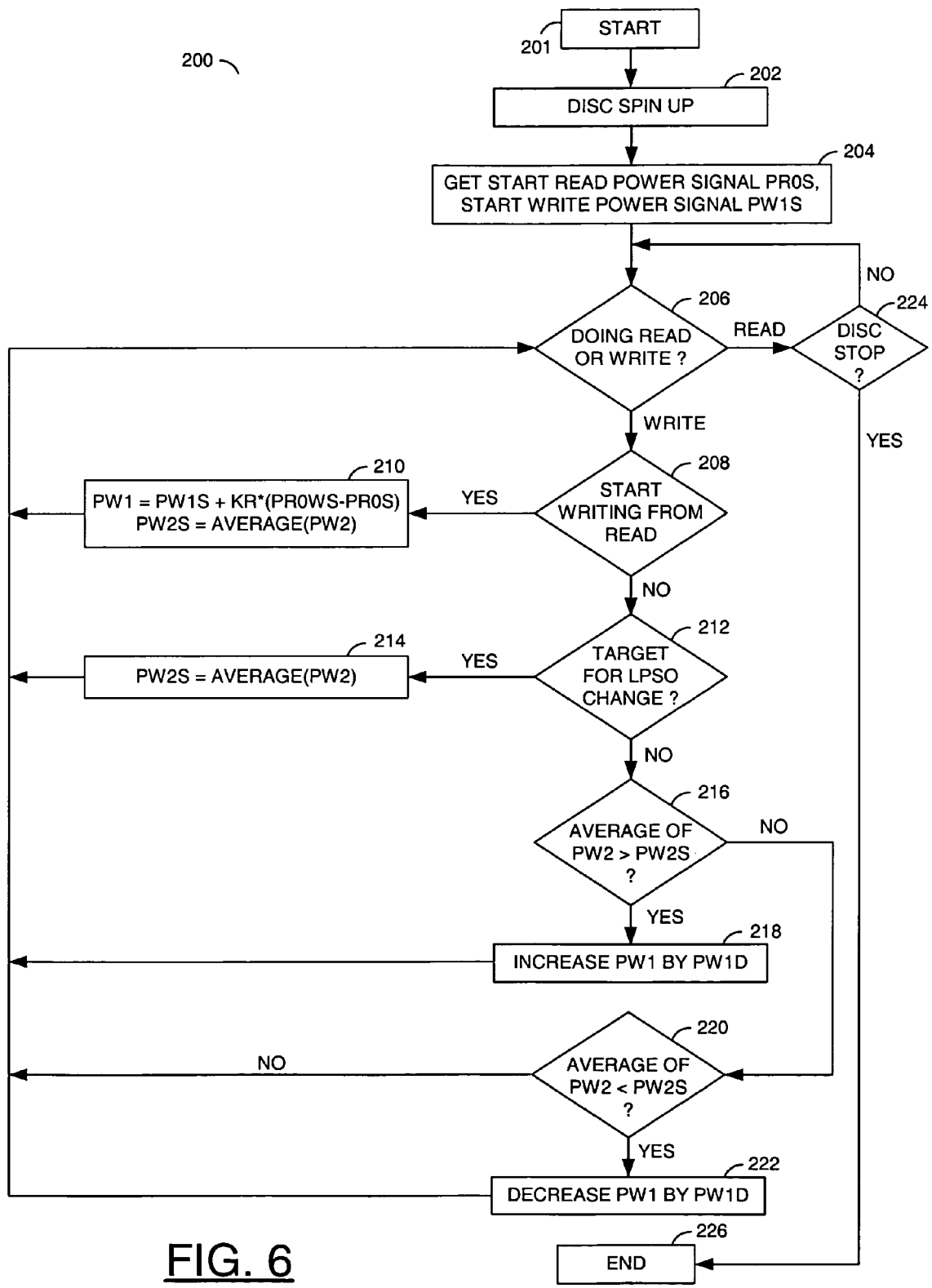
FIG. 6 is a flow diagram of a process of an embodiment of the present invention.

Referring to FIG. 6, a method 200 illustrating the present invention is shown. The method 200 generally comprises a state (or step) 201, a state (or step) 202, a state (or step) 204, a decision state (or step) 206, a decision state (or step) 208, a state (or step) 210, a decision state (or step) 212, a state (or step) 214, a decision state (or step) 216, a state (or step) 218, a decision state (or step) 220, a state (or step) 222, a decision state (or step) 224, and a state (or step) 226. The state 201 may be a start state. The state 202 may initiate a disc spin up. The state 204 may obtain the start read power control signal PR0S and the start write power signal PW1S during the first read process performed by the system 100. The decision state 206 may determine whether the system 100 is performing a read or write process. If the system 100 is performing a read process, then the method 200 moves to the state 224. The state 224 determines if the disc has stopped. If the disc has stopped, the method 200 moves to the state 226 and stops. If the disc has not stopped, the method 200 moves to the step 206. If the system 100 is performing a write process, the method 200 moves to the decision state 208. The decision state 208 may determine whether the system 100 is starting a writing process after performing a read process. If the system 100 is starting a write process after performing the read process, the state 210 may compute the write based power signal PW1 with the following equation:

$$PW1=PW1S+KR*(PR0WS-PR0S)$$

The state 210 may also set the start control output signal PW2S equal to the average value of the signal PW2. The method 200 moves back to the decision state 206. If the system 100 is not starting the writing process from the read process, the method 200 moves to the decision state 212.

If the decision state 212 determines that the target for the LPSO has changed (or the target for the LPSO for the middle write power level has changed), the method 200 moves to the state 214. The state 214 may recalculate the start control output signal PW2S as the average value of the signal PW2 at that moment. The method 200 moves back to the decision state 206. If the decision state 212 determines that the target for the LPSO for the middle write power level has not changed, the method 200 moves to the decision state 216. The decision state 216 may determine if the average of the signal PW2 is greater than the start control output signal PW2S. If the average of the signal PW2 is greater than the start control output signal PW2S, the method 200 moves to step 218. The step 218 increases the signal PW1 by the predetermined amount PWLD (or by a fixed design amount). The method 200 moves back to the decision state 206. If the average of the signal PW2 is not greater than the start control output signal PW2S, the method 200 moves to the state 220.

The decision state 220 determines if the average of the signal PW2 is less than the start control output signal PW2S. If the average of the signal PW2 is less than the start control output signal PW2S, the method 200 moves to the state 222. The state 222 decreases the signal PW1 by the predetermined amount PWLD (or the fixed design amount). The method 200 moves back to the decision state 206. If the decision state 220 determines that the average of the signal PW2 is not less than the start control output signal PW2S, the method moves back to the decision state 206.

The present invention may (i) be able to control the write power properly when temperature changes and (ii) be implemented by on a hardware and/or software solution. The present invention may (i) improve the write quality on the optical disc particularly when a disc goes into a high recording speed by better controlling the write power as the temperature changes and (ii) simple to implement, provide an efficient way to adaptively control the Write Based Power (Bias Power) as temperature changes during the write process of an optical disc.

The present invention may be applied to a number of recordable CD optical discs (e.g., CD-R, CD-RW) as well as recordable DVD disc (e.g., DVD-R, DVD-RW, DVD+R, DVD+RW, DVD-RAM, DVD-R Dual Layer, DVD+R Dual Layer) and to any future recordable optical discs (e.g., Blue-Ray or HDDVD).

The function performed by the flow diagram of FIG. 6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMS, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a first circuit configured to (i) generate a read power signal and (ii) control power of a laser beam emitted from an optical pick-up circuit during a read process;
    a second circuit configured to (i) generate a first write power signal and (ii) adjust said first write power signal in response to a second write power signal and said read power signal, wherein said adjusted first write power signal controls a power level of said laser beam during a write process; and
    a third circuit configured to generate said second write power signal and a third write power signal in response to a target write signal.

2. The apparatus according to claim 1, wherein said power level comprises (i) a write based power level, (ii) a write middle power level and (iii) a write top power level.

3. The apparatus according to claim 2, wherein said third circuit is configured to generate said second write power signal in response to said target write signal when said laser beam is emitted during said write process at said write middle power level.

4. The apparatus according to claim 3, wherein said second circuit is configured to compute a start read power signal, wherein said start read power signal is generated by taking an average value of said read power signal during an initial read.

5. The apparatus according to claim 4, wherein said second circuit is configured to generate a start write based power signal from said first write power signal.

6. The apparatus according to claim 5, wherein said second circuit is configured to generate said first write power signal when said write process is started on an optical disc with (i) a compensation factor, (ii) an average value of said read power signal prior to starting said write process, (iii) said start read power signal and (iv) said start write based power signal.

7. The apparatus according to claim 3, wherein said second circuit is configured to determine if said target write signal has changed.

8. The apparatus according to claim 7, wherein said second circuit is configured to set a start control output signal equal to an average of said second write power signal if said target write signal has changed.

9. The apparatus according to claim 7, wherein said second circuit is configured to adjust said first write power signal by increasing said first write power signal by a fixed predetermined amount if (i) said target write signal has not changed and (ii) a start control output signal is greater than an average of said second write power signal.

10. The apparatus according to claim 7, wherein said second circuit is configured to adjust said first write power signal by decreasing said first write power signal by a fixed predetermined amount if (i) said target write signal has not changed and (ii) a start control output signal is less than a second average of said second write power signal.

11. A method for controlling a write based power adaptive control system, comprising the steps of:
    (A) generating a read power signal;
    (B) controlling power of a laser beam emitted from an optical pickup unit during a read process;
    (C) generating a first write power signal;
    (D) adjusting said first write power signal in response to a second write power signal and said read power signal, wherein said adjusted first write power signal controls a power level of said laser beam during a write process; and
    (E) generating said second write power signal and a third write power signal in response to a target write signal.

12. The method according to claim 11, wherein step (E) further comprises the step of:
    generating said second write power signal in response to said target write signal when said laser beam is emitted during said write process at a write middle power level.

13. The method according to claim 12, further comprising the step of:
    computing a start read power signal during said read process, wherein said start read power signal is generated by taking an average value of said read power signal during an initial read in said read process.

14. The method according to claim 13, further comprising the step of:
    generating a start write based power signal from said first write power signal.

15. The method according to claim 14, further comprising the step of:
    generating said first write power signal when said write process is started on an optical disc with (i) a compensation factor, (ii) an average value of said read power signal calculated prior to starting said write process, (iii) said start read power signal and (iv) said start write based power signal.

16. The method according to claim 12, further comprising the step of:
    determining if said target write signal has changed.

17. The method according to claim 16, further comprising the step of:
    setting a start control output signal equal to a second average of said second write power signal if said target write signal has changed.

18. The method according to claim 16, further comprising the step of:
    adjusting said first write power signal by increasing said first write power signal by a fixed predetermined amount if (i) said target write signal has not changed and (ii) a start control output signal is greater than a second average of said second write power signal.

19. The method according to claim 16, further comprising the step of:
    adjusting said first write power signal by decreasing said first write power signal by a fixed predetermined amount if (i) said target write signal has not changed and (ii) a start control output signal is less than a second average of said second write power signal.

20. An apparatus comprising:
    a first circuit configured to (i) generate a read power signal and (ii) control power of a laser beam emitted from an optical pick-up circuit during a read process;

a second circuit configured to (i) generate a first write power signal and (ii) adjust said first write power signal by a fixed predetermined amount in response to a second write power signal and said read power signal if (a) a target write signal has not changed and (b) an average of said second write power at a beginning of a write process is greater than a second average of said second write power signal; and a third circuit configured to (i) generate said second write power signal and a third write power signal in response to said target write signal and (ii) control one or more power levels of said laser beam during said write process in response to a laser power sensor output.

21. The apparatus according to claim 20, wherein said optical pickup circuit is configured to perform said read process and said write process in response to (i) said read power signal, (ii) said first write power signal, (iii) said second write power signal, and (iv) said third write power signal.

* * * * *